United States Patent
Turng et al.

(10) Patent No.: US 9,555,564 B2
(45) Date of Patent: Jan. 31, 2017

(54) METHOD OF FABRICATING A FOAMED, INJECTION MOLDED COMPONENT WITH IMPROVED DUCTILITY AND TOUGHNESS

(71) Applicant: Wisconsin Alumni Research Foundation, Madison, WI (US)

(72) Inventors: Lih-Sheng Turng, Madison, WI (US); Xiaofei Sun, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 602 days.

(21) Appl. No.: 14/076,438

(22) Filed: Nov. 11, 2013

(65) Prior Publication Data

US 2015/0130104 A1    May 14, 2015

(51) Int. Cl.
| | |
|---|---|
| B29C 44/34 | (2006.01) |
| B29C 44/04 | (2006.01) |
| B29K 23/00 | (2006.01) |
| B29L 31/00 | (2006.01) |
| B29C 44/56 | (2006.01) |
| B29C 44/02 | (2006.01) |

(52) U.S. Cl.
CPC ............. *B29C 44/348* (2013.01); *B29C 44/04* (2013.01); *B29C 44/02* (2013.01); *B29C 44/3423* (2013.01); *B29C 44/3449* (2013.01); *B29C 44/5672* (2013.01); *B29K 2023/065* (2013.01); *B29K 2023/12* (2013.01); *B29L 2031/772* (2013.01)

(58) Field of Classification Search
CPC ...... B29C 44/02; B29C 44/04; B29C 44/3423; B29C 44/348; B29C 44/3449; B29C 44/5672
USPC ......... 264/51, 53, 328.17, 328.6, 210.6, 211, 264/211.12
See application file for complete search history.

(56) References Cited

U.S. PATENT DOCUMENTS

| | | |
|---|---|---|
| 3,488,412 A | 1/1970 | Bielfeldt Friedrich Bernd et al. |
| 3,575,931 A | 4/1971 | Sherman et al. |
| 3,730,918 A | 5/1973 | Teti et al. |
| 4,331,619 A | 5/1982 | Chung et al. |
| 4,806,294 A | 2/1989 | Lapierre et al. |
| 5,679,723 A | 10/1997 | Cooper et al. |

(Continued)

OTHER PUBLICATIONS

Haugen et al, "A Novel Processing Method for Injection-Molded Polyether-Urethane Scaffolds. Part 1: Processing", Wiley InterScience (www.interscience.wiley.corn) DOI: 10.1002/jbm.b. 30396, Oct. 20, 2005, pp. 65-72.

(Continued)

*Primary Examiner* — Alison L Hindenlang
*Assistant Examiner* — Lawrence D Hohenbrink, Jr.
(74) *Attorney, Agent, or Firm* — Boyle Fredrickson, S.C.

(57) ABSTRACT

A method of fabricating a foamed, injection-molded component is provided. The method includes the step of plasticizing pellets including a first polymeric material and a second polymeric material within an injection barrel to form an injection material. The first polymeric material defines a first phase of the injection material and the second polymeric material defines a second phase of the injection material. The first and second phases of the injection material are immiscible. The injection material is injected into a mold to fabricate the foamed injection-molded component having microscale, microcellular voids. Upon tensile loading, submicron, secondary phase cavities are formed in the injection-molded component, resulting in improved ductility and toughness.

27 Claims, 5 Drawing Sheets

(56) References Cited

U.S. PATENT DOCUMENTS

| | | | |
|---|---|---|---|
| 5,837,177 | A | 11/1998 | DiNardo et al. |
| 6,103,255 | A | 8/2000 | Levene et al. |
| 6,221,924 | B1 | 4/2001 | Mori et al. |
| 6,228,898 | B1 | 5/2001 | Nakanishi |
| 6,306,424 | B1 | 10/2001 | Vyakarnam et al. |
| 6,322,347 | B1 | 11/2001 | Xu |
| 6,323,245 | B1 | 11/2001 | Ramesh |
| 6,333,029 | B1 | 12/2001 | Vyakarnam et al. |
| 6,335,378 | B1 | 1/2002 | Colman |
| 6,365,149 | B2 | 4/2002 | Vyakarnam et al. |
| 6,534,084 | B1 | 3/2003 | Vyakarnam et al. |
| 6,626,950 | B2 | 9/2003 | Brown et al. |
| 6,692,761 | B2 | 2/2004 | Mahmood et al. |
| 6,746,685 | B2 | 6/2004 | Williams |
| 6,773,713 | B2 | 8/2004 | Bonassan et al. |
| 6,852,330 | B2 | 2/2005 | Bowman et al. |
| 6,884,428 | B2 | 4/2005 | Binette et al. |
| 7,098,292 | B2 | 8/2006 | Zhao et al. |
| 7,112,417 | B2 | 9/2006 | Vyakarnam et al. |
| 7,144,926 | B2 | 12/2006 | Galaton |
| 2002/0091226 | A1 | 7/2002 | Nichols et al. |
| 2003/0059567 | A1* | 3/2003 | Cediel ............... B29C 44/583 428/54 |
| 2004/0010048 | A1 | 1/2004 | Evans et al. |
| 2004/0026811 | A1 | 2/2004 | Murphy et al. |
| 2005/0107868 | A1 | 5/2005 | Nakayama et al. |
| 2005/0165475 | A1 | 7/2005 | Noh |
| 2005/0187322 | A1 | 8/2005 | Park et al. |
| 2006/0002978 | A1 | 1/2006 | Shea et al. |
| 2006/0083771 | A1 | 4/2006 | Yamamoto et al. |
| 2006/0153814 | A1 | 7/2006 | Lio et al. |
| 2006/0264599 | A1 | 11/2006 | Anno et al. |
| 2009/0017094 | A1 | 1/2009 | Turng et al. |
| 2009/0082507 | A1 | 3/2009 | Egashira et al. |
| 2012/0061867 | A1* | 3/2012 | Dougherty, Jr. .... B29C 44/3461 264/13 |

OTHER PUBLICATIONS

Shag, Xin Xin et al, "Evaluation of a hybrid scaffold/cell construct in repair of high-load-bearing osteochondral defects in rabbits", Biomaterials 27 (2006) pp. 1071-1080.

Nho, Shane J. et al, "Patellofemoral Osteochondral Autologous Transfer, Techniques in Knee Surgery", 5(2), pp. 134-137, 2006.

Mikos, Antonios G. et al, Preparation arid characterization of poly (L-lactic acid) foams, Polymer, vol. 35, No. 5, 1994, pp. 1068-1077.

Mooney, David J. et al, "Novel approach to fabricate porous sponges of poly (D,L-lactic-coglycolic acid) without the use of organic solvents", Biomaterials 17 (1996), 1417-1422.

Nam, Yoon Sung et al, "A novel fabrication method of macroporous biodegradable polymer scaffolds using gas foaming salt as a porogen additive", Journal of Biomedical Materials Research (Applied Biomaterials) 53:1-7, 2000.

Harris, Leatrese et al, "Open Pore Biodegradable matrices formed with gas foaming", Journal of Biomedical Materials Research, vol. 42, No. 3, Dec. 5, 1998, pp. 396-402.

Washburn, Newell R. et al, "Co-extrusion of biocompatible polymers for scaffolds with co-continuous morphology", Journal of Biomedical Materials Research, vol. 60, No. 1, pp. 20-29.

Wang, Xiaoxi et al, "Solvent Free Fabrication of Biodegradable Porous Polymers", Proceedings of Imece04, pp. 595-602, 2204, American Society of Mechanical Engineers, New York, NY.

Wu, Linbo et al, "A 'room temperature' injection molding/particulate leaching approach for fabrication of biodegradable three-dimensional porous scaffolds", Biomaterials, 27 (2006), pp. 185-191.

Leicher, S. et al, "MuCell(R) technology for injection molding: A processing method for polyether-urethane scaffolds", Journal of Materials Science, 40 (17): 4613-4618.

Reignier, Joel et al, "Preparation of Interconnected Polycaprolactone Porous Scaffolds by a Combination Polymer and Salt particulate Leaching", Proceedings of ANTEC 2005, pp. 2550-2554.

Neves, Nuno M. et al, "The morphology, mechanical properties and ageing behavior of porous injection molded starch-based blends for tissue engineering scaffolding", Materials Science & Engineering. C25 (2205) pp. 195-200.

Lee, J.J. et al., Improvement in Surface Quality of Microcellular Injection Molded Parts, ANTEC 2009, p. 1662.

Michaeli, W. et al., "Profoam—A New Foaming Process for Injecting Molding", ANTEC 2008, p. 1019.

Saucceau, M. et al., "New challenges in polymer foaming: A review of extrusion processes assisted by supercritical carbon dioxide", Progress in Polymer Science 36 (2011) 749-766.

Gale, M., "Foam extrusion of engineering and commodity polymers using carbon dioxide as a blowing agent", British Plastics and Rubbers, 2000, p. 4.

Pfannschimidt, O. et al., "Foam Injection Molding of Thermoplastics Loaded With Carbon Dioxide Prior to Processing", ANTEC 1999, p. 2100.

Lee, J.J. et al., "Novel Foam Injection Molding Technology Using Carbon Dioxide-Laden Pellets", Polymer Engineering and Science, 2011, DOI: 10.1002/pen.22004.

S.G.Kim et al., Foamability of Thermoplastic vulcanizates (TPVs) with Carbon Dioxide and Nitrogen, Cellular Polymers; 2006; 25, 1, p. 19.

G. Li et al., "Measurement of Gas Solubility in Linear/Branched PP Melts", J. Poly. Sci. Part B-Poly. Phy., 2007, 45, p. 2497.

E. Di Maio et al., "Structure Optimization of Polycaprolactone Foams by Using Mixtures of CO2 and N2 as blowing Agents", Polymer Engineering and Science, 45, 32 (2005).

Wong, A. et al., In Situ Observations of Polystyrene Foaming Processes with Carbon Dioxide Nitrogen Gas Blends, ANTEC 2011.

Crank J., "The Mathematics of Diffusion", Oxford University, Press, United Kingdom 1975.

Flumerfelt, R. et al., "Nitrogen Solubilities in Low-Density Polyethylene at High Temperatures and High Pressures", Journal of Applied Polymer Science, vol. 58, 2213-2219 (1995).

Areerut, S. et al., "Measurement and Prediction of Diffusion Coefficients of Supercritical CO2 in Molten Polymers", Polymer Engineering and Science, Oct. 2004, vol. 44, No. 10, p. 1915.

J.J. Lee et al., "A novel method for improving the surface quality of microcellular injection molded parts", Polymer 52 (2011) 1436-1446.

M. Volmer et al., "Keimbildung in ubersattigten Gebilden", Z., Phys. Chem., 1926, 119, p. 277.

D.L. Tomasko et al., "Development of CO2 for polymer foam applications", J. of Supercritical Fluids 47 (2009) 493-499.

J.S. Colton et al., "The Nucleation of Microcellular Thermoplastic Foam with Additives: Part I: Theoretical Considerations", Polym. Eng. Sci., Mid-Apr. 1987, vol. 27, No. 7, p. 485.

J.S. Colton et al., :The Nucleation of Microcellular Thermoplastic Foam With Additives: Part II: Experimental Results and Decisions, Polym. Eng. Sci., Mid-Apr. 1987, vol. 27, No. 7, p. 493.

Hasan et al., "PVT Behaviors of Polystyrene in Presence of CO2+N2 Blends", ANTEC 2011.

Zhang, CL et al., "Extruded polystyrene foams with bimodal cell morphology", Polymer 53 (2012) 2435-2442.

Gendron et al., "Foaming polystyrene with a mixture of CO2 and ethanol", J. Cellu. Plast., 2006 42, 127.

Zhao et al., "Morphology and Properties of Injection Molded Solid and Microcellular Polylactic Acid/Polyhydroxybutyrate-Valerate (PLA/PHBV) Blends", Ind. Eng. Chem. Res. 2013, 52, 2569-2581.

Zhao et al., "Processing and characterization of solid and microcellular poly(lactic acid)/polyhydroxybutyrate-valerate (PLA/PHBV) blends and PLA/PHBV/Clay nanocomposites", Composites: Part B 51, 2013. 79-91.

* cited by examiner

FIG. 4C (a) Ductility          (b) Young's Modulus FIG. 5a          FIG. 5b (a) Ductility          (b) Young's Modulus FIG. 6a          FIG. 6b

METHOD OF FABRICATING A FOAMED, INJECTION MOLDED COMPONENT WITH IMPROVED DUCTILITY AND TOUGHNESS

FIELD OF THE INVENTION

This invention relates generally to injection molding, and in particular, to a method for fabricating a foamed, injection molded component with improved ductility and toughness over prior injection molded components.

BACKGROUND AND SUMMARY OF THE INVENTION

Plastics are the most widely used materials in the United States, surpassing steel, copper, and aluminum combined by volume. Among the various polymer processing methods, injection molding accounts for one-third of all materials processed. While plastics have become ubiquitous and have greatly improved our quality of life, the rising cost of fossil-based plastics, as well as the environmental burden, cannot be overlooked. Special injection molding processes that reduce material usage and energy consumption are highly desirable to cut production costs, save natural resources, and reduce permanent waste.

Microcellular injection molding is an emerging special injection molding process capable of producing foamed parts with many advantages. During the microcellular injection molding process, a supercritical fluid is introduced into a molten polymer prior to the polymer being injected into a mold. The polymer solidifies in the mold to form a desired component. The introduction of the supercritical fluid prior to injection of the polymer into the mold causes tiny bubbles to be distributed throughout the molded component. By providing tiny bubbles in the molded component, the amount of material necessary to mold the component is reduced, while the dimensional stability of the molded component is improved.

While the microcellular injection molding process saves on material cost and improves production efficiency as compared to conventional solid injection molding, the process does have certain limitations. By way of example, microcellular injection molding requires specially designed supercritical fluid delivery and dosing systems to be installed on the injection molding machine for the delivery of the supercritical fluid as a physical blowing agent. In addition, modifications need to be made to the injection molding machine itself, including the installation of a supercritical fluid delivery device and a special injection screw with mixing elements for effectively mixing the supercritical fluid with the liquid polymer. These two factors lead to an increase in capital investment, especially when a large number of injection molding machines need to be modified.

Alternatively, the microcellular injection molding process may performed be using gas-laden pellets processed by a conventional injection molding machines. More specifically, pellets of a polymer are saturated with a physical blowing agent in a high pressure vessel. These gas-laden pellets are introduced into the injection molding machine, which, in turn, are used to fabricate foamed injection molded parts. This type of process offers all of the aforementioned benefits of microcellular injection molding, yet requires a much lower investment in equipment.

While the microcellular injection molding process saves on material cost and improves production efficiency as compared to conventional solid injection molding, the process does have certain disadvantages and limitations. For example, components fabricated using the microcellular injection molding processes heretofore described exhibit relatively poor ductility and toughness. As a result, these components tend to be brittle, especially for thin-wall products. In order to improve ductility and toughness, modifiers such as fibers or rubber particles are commonly introduced during the foaming process of a component. However, while these modifiers do increase the ductility and toughness of the component, the modifiers are expensive thereby reducing the cost benefits of the microcellular injection molding process. Further, use of modifiers has been found to reduce the high temperature performance and increase the overall weight of the component.

Therefore, it is a primary object and feature of the present invention to provide a method for fabricating foamed, injection molded components with improved ductility over prior injection molded components.

It is a further object and feature of the present invention to provide a method for fabricating foamed, injection molded components which is compatible with prior microcellular injection molding processes.

It is a still further object and feature of the present invention to provide a method for fabricating foamed, injection molded components which is simple and which may be performed with standard injection molding machinery.

In accordance with the present invention, a method is provided of fabricating an injection-molded component. The method includes the step of introducing pellets and a first supercritical fluid into an injection barrel of an injection molding machine. The pellets include a first polymeric material and a second polymeric material. The pellets are plasticized within the injection barrel to form an injection material. The first polymeric material defines a first phase of the injection material and the second polymeric material defines a second phase of the injection material. The first phase and the second phase are immiscible. The injection material is injected into a mold to fabricate the injection-molded component.

Microcellular voids having diameters are formed in the injected-molded component. The injected-molded component may be subjected to tensile loading and secondary phase cavities having diameters may be formed in the injected-molded component in response to the tensile loading of the injected-molded component. The diameters of the microcellular voids are greater than the diameters of the secondary phase cavities. The microcellular voids have diameters greater than 10 micrometers and the secondary phase cavities have diameters less than 1 micrometer. Preferably, the microcellular voids have diameters in the range of 50 to 100 micrometers.

In a first arrangement, the first and second polymeric materials and the first supercritical fluid are heated to produce a melt. The melt is extruded and the pellets are formed from the extruded melt. Alternatively, the first supercritical fluid may be introduced into the injection barrel downstream of the pellets. By way of example, it is contemplated for the first polymeric material to be polypropylene (PP) and the second polymeric material to be high-density polyethylene (HDPE). The injection material includes at least 50% of the first polymeric material and less than 50% of the second polymeric material, and preferably, the first polymeric material is in the range of 60% to 85% of the injection material.

In accordance with a further aspect of the present invention, a method is provided for fabricating a foamed, injection-molded component. The method includes the step of plasticizing pellets including a first polymeric material and a second polymeric material within an injection barrel to form an injection material. The first polymeric material defines a first phase of the injection material and the second polymeric material defines a second phase of the injection material. The injection material is injected into a mold to fabricate the foamed, injection-molded component. The first phase and the second phase of the injection material are immiscible.

Microcellular voids having diameters are formed in the injected-molded component. The injected-molded component may be subjected to tensile loading and secondary phase cavities having diameters may be formed in the injected-molded component in response to the tensile loading of the injected-molded component. The diameters of the microcellular voids are greater than the diameters of the secondary phase cavities. The microcellular voids have diameters greater than 10 micrometers and the secondary phase cavities have diameters less than 1 micrometer. Preferably, the microcellular voids have diameters in the range of 50 to 100 micrometers.

In a first arrangement, the first and second polymeric materials and the first supercritical fluid are heated to produce a melt. The melt is extruded and the pellets are formed from the extruded melt. Alternatively, the first supercritical fluid may be introduced into the injection barrel downstream of the pellets. By way of example, it is contemplated for the first polymeric material to be polypropylene (PP) and the second polymeric material to be high-density polyethylene (HDPE). The injection material includes at least 50% of the first polymeric material and less than 50% of the second polymeric material, and preferably, the first polymeric material is in the range of 60% to 85% of the injection material.

In accordance with a still further aspect of the present invention, a method is provided for fabricating a foamed, injection-molded component. The pellets include a first polymeric material and a second polymeric material are plasticized within an injection barrel to form an injection material. The injection material is injected into a mold to fabricate the foamed injection-molded component. Microcellular voids having diameters are formed in the injected-molded component. The injected-molded component may be subjected to tensile loading and secondary phase cavities having diameters may be formed in the injected-molded component in response to the tensile loading of the injected-molded component. The diameters of the microcellular voids are greater than the diameters of the secondary phase cavities.

It is contemplated for the microcellular voids to have diameters greater than 10 micrometers and for the secondary phase cavities to have diameters less than 1 micrometer. Preferably, the microcellular voids have diameters in the range of 50 to 100 micrometers. The first polymeric material defines a first phase of the injection material and the second polymeric material defines a second phase of the injection material. The first and second phases of the injection material are immiscible. By way of example, it is contemplated for the first polymeric material to be polypropylene (PP) and the second polymeric material to be high-density polyethylene (HDPE). The injection material includes at least 50% of the first polymeric material and less than 50% of the second polymeric material, and preferably, the first polymeric material is in the range of 60% to 85% of the injection material.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF DRAWINGS

Figure 1:
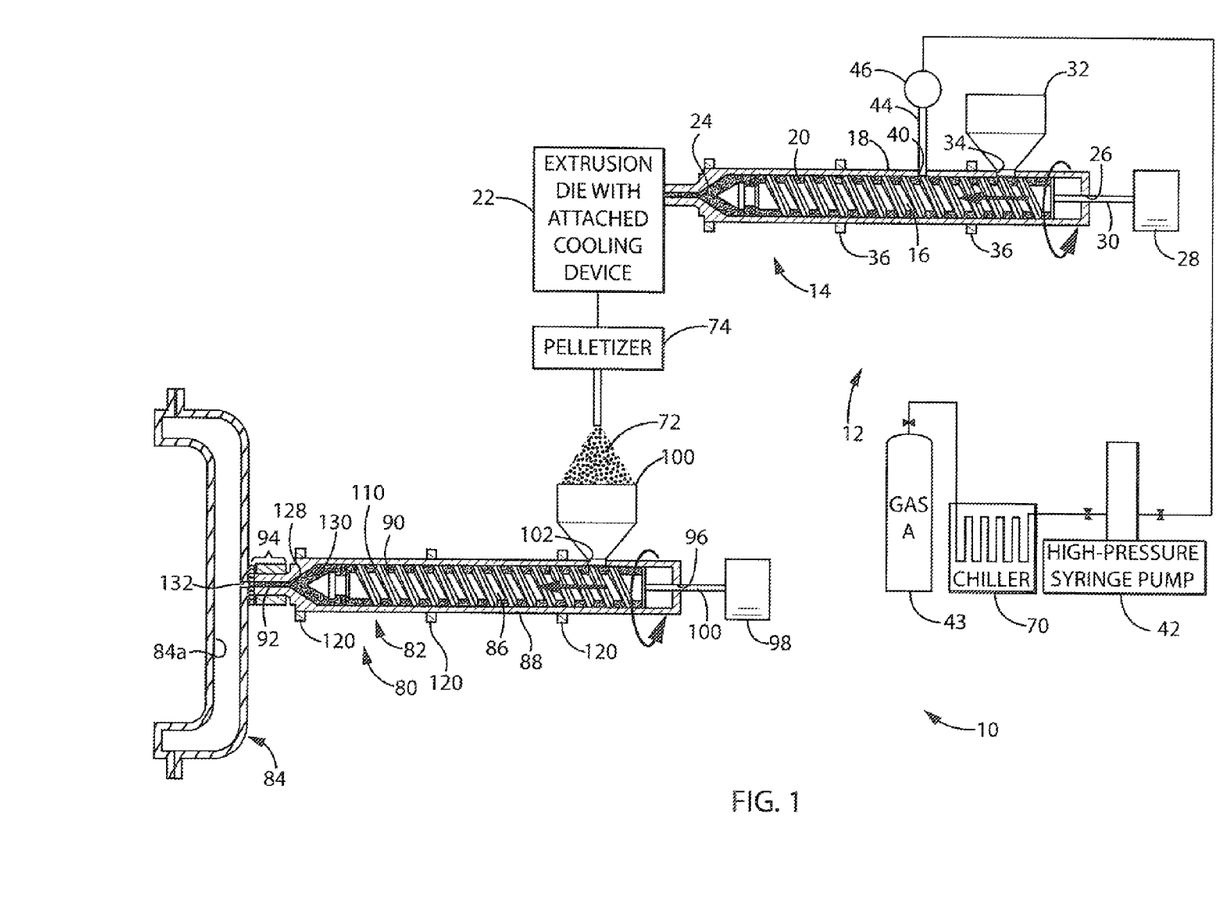
FIG. 1 is a schematic view of an apparatus for fabricating foamed, injection molded component in accordance with the methodology of the present invention.

Referring to FIG. 1, an apparatus for performing the methodology of the present invention is generally designated by the reference numeral 10. Apparatus 10 includes equipment set-up 12 for the production of supercritical fluid (SCF)-laden pellets. Set-up 12 includes extruder 14 having screw 16 extending along a longitudinal axis and being rotatably supported within barrel 18 to convey polymeric material downstream within polymer processing space 20 toward extrusion die 22. Seals (not shown) may be provided on the flights of screw 16, for reasons hereinafter described. Barrel 18 is adapted to receive polymeric materials that are fluidic, or can form a fluid that subsequently hardens to form a conventional, or solid, polymeric article or component. Barrel 18 includes a first end fluidly connected to mold extrusion die 22 through nozzle 24 and a second, opposite end having aperture 26 extending therethrough. Drive motor 28 is operatively connected to screw 16 by drive shaft 30 extending through aperture 26 in second end of barrel 18. Drive motor 28 is operatively connected to a controller (not shown) for controlling rotational and axial movement of screw 16.

Extruder 14 further includes hopper 32 for introducing polymer material into barrel 18. The material in hopper 32 is delivered into polymer processing space 20 within barrel 18 through an orifice 34. Polymer processing space 20 is defined by the outer surface of screw 16 and the inner surface of barrel 18. It is noted that the polymer material may be in the form of solid pellets introduced through orifice 34 and plasticized within barrel 18. More specifically, in order to plasticize the polymer material with barrel 18, a plurality of temperature control units 36 are positioned along barrel 18. For example, control units 36 can take any suitable form such as electrical heaters or the like. It is intended for control units 36 to heat a stream of pelletized or fluid polymeric material within barrel 18 to facilitate melting and/or cooling of the stream to control viscosity. If desired, control units 36 can operate differently at different locations along barrel 18.

Extruder 14 further includes at least one port 40 fluidly connecting syringe pump 42 to polymer processing space 20 within barrel 18. As hereinafter described, it is intended for a supercritical fluid to be injected into the polymeric material within the polymer processing space 18 to form a SCF-laden polymeric material therein. A pressure and metering device or injector 44 is provided between syringe pump 42 and the at least one port 40. In the preferred embodiment, injector 44 is configured as two cylinders, a smaller one with a tip on top of a larger diameter one. In this injector design, the tip has been removed, and it has a broad area, to allow more gas to penetrate through the Porcerax, which is a porous metallic alloy that allows the supercritical fluid to flow therethrough, while preventing the much more viscous polymer melt from leaking therein. As such, injector 44 may be used to meter the supercritical fluid introduced into the polymeric stream within barrel 18.

It is intend for syringe pump 42 to facilitate the flow of a blowing agent, namely, a liquid or supercritical fluid, (e.g. nitrogen or carbon dioxide) from source 43 to injector 44 at the low, constant flow rate. One exemplary syringe pump 42 is available as Model No. 260D from Teledyne ISCO of Lincoln, Nebr. Pressure regulator 46 and a pump controller (not shown) interconnects syringe pump 42 and injector 44 and controls the flow rate of the supercritical fluid provided thereto. In instances in which the supercritical fluid is carbon dioxide, chiller 70 interconnects source 43 and syringe pump 42. As the carbon dioxide flows from source 43 to syringe pump 42, chiller 70 acts to maintain the carbon dioxide in a liquid state under pressure, thereby facilitating the control over the flow rate and the pressure of the carbon dioxide supplied to injector 44. In instances in which the supercritical fluid is nitrogen, chiller 70 is unnecessary since control of the flow and pressure of thereof can be attained at or near ambient or room temperature.

Figure 4A:
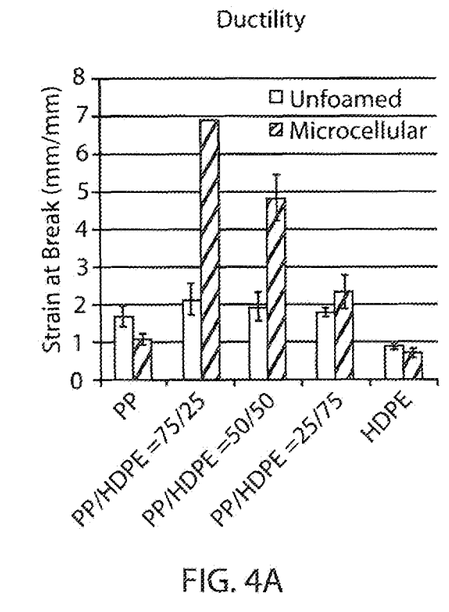
FIGS. 4a-4c are graphical representations of the ductility, Young's modulus and toughness of a component fabricated with a first material blend in accordance with the methodology of the present invention as compared to other components.
Figure 4B:
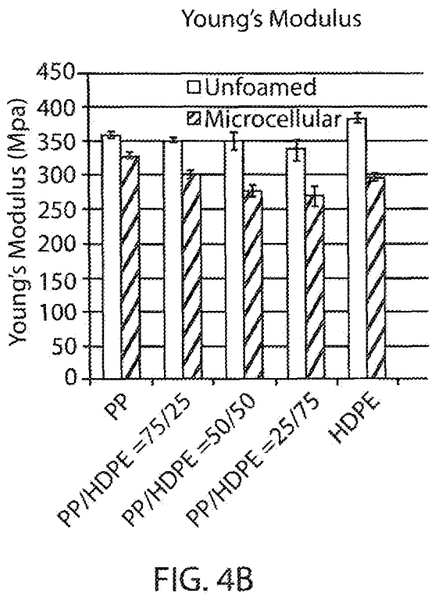
Figure 4C:
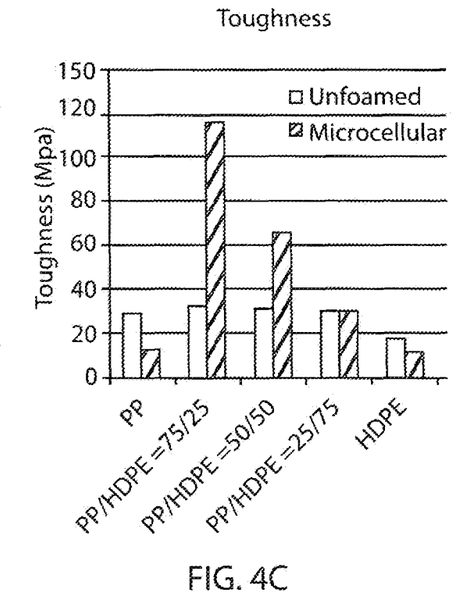

In operation, it is contemplated to provide first and second pelletized, polymeric materials which are immiscible in hopper 32. By way of example, it is contemplated to utilize polypropylene (PP) and high-density polyethylene (HDPE) in a preselected ratio. It can be appreciated that other polymeric materials may be utilized without deviating from the scope of the present invention. Referring to FIGS. 4a-4c, it has been found that by utilizing a preselected ratio of at least 50% PP to 50% HDPE, a component molded in accordance with the methodology of the present herein described will show a significant improvement in the ductility and toughness as compared with components manufacture without HDPE or with less than 50% PP. Further, it is noted that elasticity of the component molded in accordance with the methodology of the present herein described remains relatively constant as compared with components manufactured without IHDPE or with less than 50% PP. As best seen in FIGS. 4a and 4c, preferably, a preselected ratio of approximately 75% PP to 25% HDPE is used to maximize the ductility and toughness of the molded component.

Figure 5A:
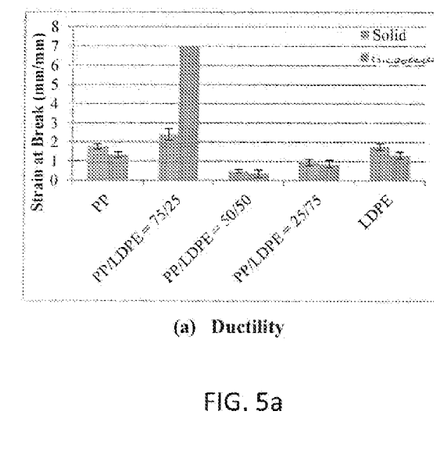
FIGS. 5a-5b are graphical representations of the ductility and Young's modulus of a component fabricated with a second material blend in accordance with the methodology of the present invention as compared to other components.
Figure 5B:
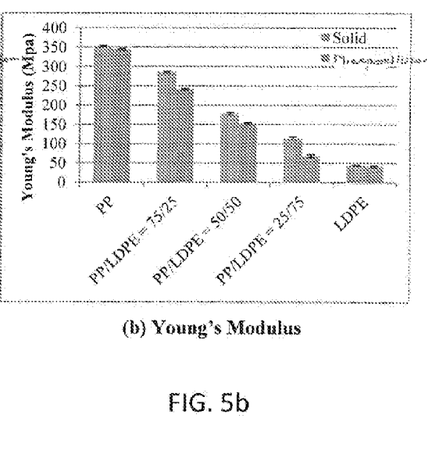

Referring to FIGS. 5a-5b, it is also contemplated to utilize polypropylene (PP) and low-density polyethylene (LDPE) in a preselected ratio. It has been found that by utilizing a preselected ratio of approximately 75% PP to 25% I-IDPE, a component molded in accordance with the methodology of the present herein described will show a significant improvement in the ductility as compared with components manufacture without LDPE or with significantly less than 75% PP. Further, it is noted that elasticity of the component molded in accordance with the methodology of the present herein described remains relatively constant as compared with non-foamed components manufactured with the same material ratios. As such, a preselected ratio of approximately 75% PP to 25% LDPE may also used to maximize the ductility of the molded component.

Figure 6A:
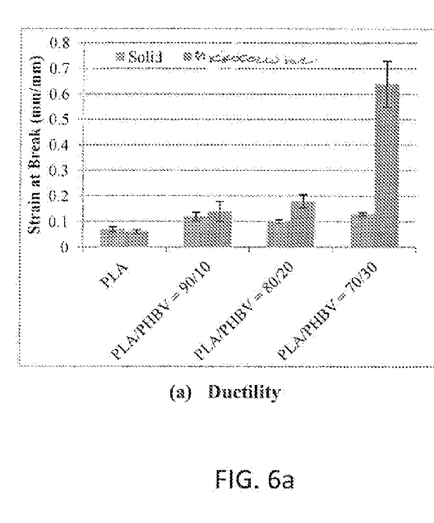
FIGS. 6a-6b are graphical representations of the ductility and Young's modulus of a component fabricated with a third material blend in accordance with the methodology of the present invention as compared to other components.
Figure 6B:
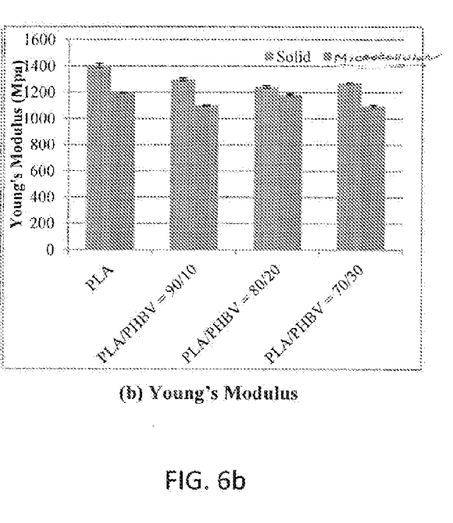

Referring to FIG. 6a-6b, it is still further contemplated to utilize polylactic acid (PLA) and poly(3-hydroxybutyrate-co-3-hydroxyvalerate) (PHBV) in a preselected ratio. It has been found that by utilizing a preselected ratio of approximately 75% PLA to 25% PHBV, a component molded in accordance with the methodology of the present herein described will show a significant improvement in the ductility as compared with non-foamed components, as well as, components manufactured without PHBV or with significantly greater than 70% PLA. Further, it is noted that elasticity of the component molded in accordance with the methodology of the present herein described remains relatively constant as compared with non-foamed components manufactured with the same material ratios. As such, a preselected ratio of approximately 70% PLA to 30% PHBV may also used to maximize the ductility of the molded component.

At the beginning of a cycle, screw 16 is axially positioned adjacent the first end of barrel 18 in an initial position. The pelletized polymeric material in hopper 32 is delivered in accordance with the presented ratio, heretofore described, into polymer processing space 20 in barrel 18 through orifice 34. Screw 16 is rotated to urge the polymeric material downstream such that the mechanical energy generated by rotation of screw 16 and control units 36 plasticize the polymeric materials in polymer processing space 20 in barrel 18. It is intend for the first polymeric material to define a first phase of the plasticized material and for the second polymeric material to define a second phase of the plasticized material wherein the first phase and the second phase of the injection material are immiscible. The first supercritical fluid is introduced into polymer processing space 20 through port 40 where it is mixed with the plasticized polymeric materials via screw 16. Screw 16 maintains sufficient back pressure at all times to prevent premature foaming or the loss of pressure within extruder 14.

The seals located on the flights of screw 16 limit the escape of any supercritical fluid flashing off the plasticized polymeric materials. Extrusion die 22 is configured such that the SCF-laden polymeric materials will not foam or foam minimally before and after it exits nozzle of extruder 14. More specifically, extrusion die 22 is of sufficient length to facilitate the cooling of the SCF-laden polymeric material, thus suppressing the nucleation of bubbles therein. Also, to prevent the foaming from taking place prematurely, the temperature can be reduced further by cooling the SCF-laden polymeric material with vortex gas cooling tubes and/or extruding the SCF-laden polymeric materials into a water bath. In the course of the operation of the equipment of the proposed set-up 12, the amount of supercritical fluid that can be added without premature foaming of the SCF-laden polymeric materials can be determined experimentally. Other variables that ensure process stability, determine foaming rates, assess the shelf life of the SCF-laden pellets produced, and contribute to subsequent extrusion and injection molding processes can also be determined.

The SCF-laden polymeric materials exit extrusion die 22 in strand form and are cooled, e.g. by means of a water bath or, in the case of a water soluble polymeric material, vortex gas cooling tubes or an air blade. Thereafter, the strands of SCF-laden polymeric materials are fed to pelletizer 74, wherein the strands are chopped or otherwise cut into suitably sized pellets 72. Pellets 72 are oven dried to remove the moisture content thereof. Once produced, pellets 72 may be used in a conventional, injection molding machine to produce a desired component, as hereinafter described.

In order to form the component in accordance with the methodology of the present invention, apparatus 10 further includes an injection molding machine, generally designated by the reference numeral 80. Injection molding machine 80 includes extruder 82 fluidly connected to mold 84. Screw 86 extends along a longitudinal axis and is rotatably supported within barrel 88 to convey polymeric material downstream within polymer processing space 90 toward mold 84. Barrel 88 is adapted to receive pellets 72, as heretofore described, which form a fluid therein and which subsequently harden to form a foamed, polymeric component. Barrel 88 includes a first end fluidly connected to mold 84 through nucleating pathway 92 of nucleator 94 and a second, opposite end having aperture 96 extending therethrough. Drive motor 98 is operatively connected to screw 86 by drive shaft 100 extending through aperture 96 in second end of barrel 88. Drive motor 98 is operatively connected to a controller (not shown) for controlling rotational and axial movement of screw 86.

Injection molding machine 80 includes hopper 100 for receiving pellets 72 of the pelletized SCF-laden polymeric materials therein. Pellets 72 are delivered into polymer processing space 90 within barrel 88 through orifice 102. Polymer processing space 90 is defined by the outer surface of screw 86 and the inner surface of barrel 88. Plasticizing section 110 is adapted for plasticizing pellets 72 within barrel 88. More specifically, a plurality of temperature control units 120 are positioned along barrel 88. For example, control units 120 can take any suitable form such as electrical heaters or the like. It is intended for control units 120 to heat and plasticize pellets 72 within barrel 88 to facilitate melting and/or cooling of the stream to control viscosity and, in some cases, the solubility of the foaming agent. Control units 120 can operate differently at different locations along barrel 88. For example, a first portion of control units 120 may heat the stream at one or more locations along barrel 88, while a second portion of the control units 120 may cool the stream at one or more different locations along barrel 88.

A restriction element (not shown) may be provided to maintain the plasticized SCF-laden polymeric materials downstream thereof at sufficient pressure throughout the injection process. The restriction element can take any of a variety of forms known in the art for restricting the upstream flow of polymer material, such as a blister, a dam across the feed-section of the screw, a reverse screw flight, a valve or a ring check valve.

In order to form a desired component, pellets 72 are deposited in hopper 100. At the beginning of an injection cycle, screw 86 is axially positioned adjacent the first end of barrel 88 in an initial position. The pelletized SCF-laden polymeric materials in hopper 100 are delivered into polymer processing space 90 in barrel 88 through orifice 102 and screw 86 is rotated to urge the SCF-laden polymeric materials downstream. Screw 86 maintains sufficient back pressure at all times to prevent premature foaming or the loss of pressure within extruder 82. The solution of the supercritical fluid and the SCF-laden polymeric materials formed in extruder 82 has a very low viscosity which advantageously allows lower temperature molding, as well as, rapid filling of molds having close tolerances to form very thin molded parts. The polymeric material and foaming agent solution is accumulated in accumulation region 130 within barrel 88 downstream of screw 86.

Once a sufficient volume of the solution has accumulated in the accumulation region 130, screw 86 is moved in a downstream direction so as to inject the solution into nucleating pathway 92 through inlet 128 thereof. As the solution of the SCF-laden polymeric materials and foaming agent passes through nucleating pathway 92, the pressure drop in the nucleating pathway 92 causes the nucleation of the solution. The nucleated SCF-laden polymeric materials are injected into the molding chamber of mold 84 through outlet 132 of nucleating pathway 92. After injection, screw 86 once again rotates to build up the polymeric materials (and foaming agent) in the accumulation region 130 for the next injection.

The nucleated SCF-laden polymeric materials received in the molding chamber of mold 84 begin to cool as soon as the nucleated SCF-laden polymeric materials contact inner surface 84a of mold 84. The molding chamber of mold 84 is filled with the nucleated SCF-laden polymeric materials and the nucleated SCF-laden polymeric materials solidify into component 134 as it cools. After a sufficient time period has passed, the cooled component 134, FIGS. 3a-3c, may now be ejected from mold 84. As is conventional, the size and shape of component 134 corresponds to the size and shape of the molding chamber of mold 84. Mold 84 is opened and the component 134 is ejected therefrom. Once component 134 is ejected, mold 84 is closed and the process may be repeated.

Figure 3A:
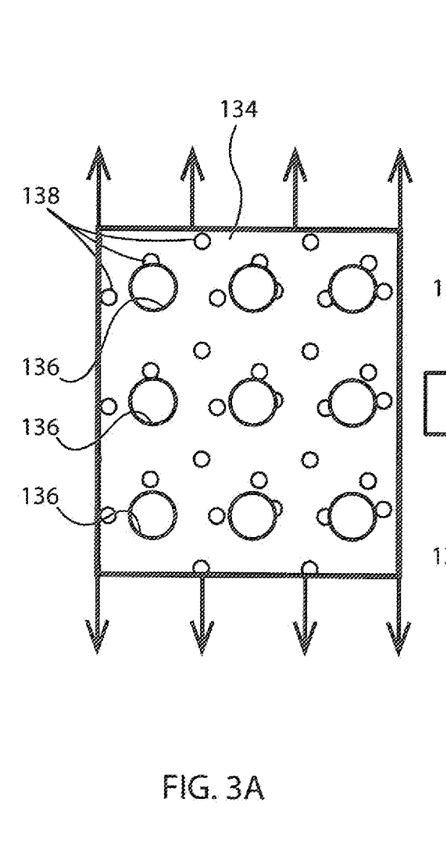
FIGS. 3a-3c are representations of the morphology of a component fabricated in accordance with the methodology of the present invention undergoing tensile loading.
Figures 3B, 3C:
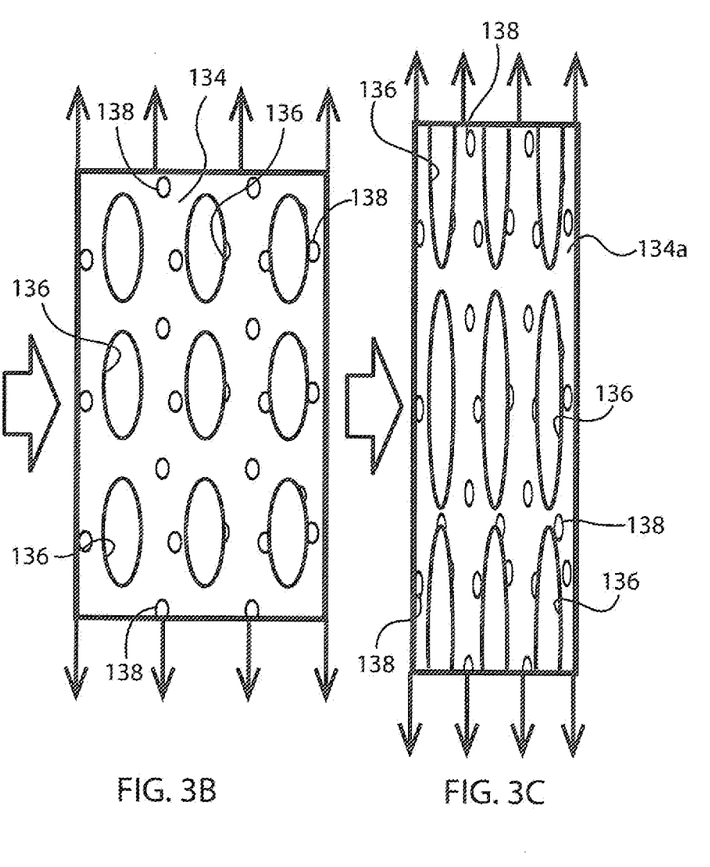

Referring to FIGS. 3a-3c, it can be seen that component 134 includes a plurality of microcellular voids 136 therein. Under tensile loading, the second phase of the polymeric material cavitates, thereby allowing for the formation of a plurality of secondary phase cavities 138 in component 134. It can be appreciated that the diameters of the microcellular voids are greater than the diameters of the secondary phase cavities 138. By molding component 134 utilizing two immiscible polymeric materials (e.g., polypropylene (PP) and high-density polyethylene (HDPE)) in the preselected ratio, as heretofore described, in accordance with the methodology of the present invention, it has been found that microcellular voids 136 have diameters greater than 10 micrometers, and preferably, in the range of 50 to 100 micrometers, while secondary phase cavities 138 have diameters less than 1 micrometer. The combination of microcellular voids 136 and secondary phase cavities 138 in component 134 results in the ductility of component 134 being at least three times as high as the ductility of unfoamed solid parts, FIG. 4a. More specifically, as best seen in FIG. 3c, under tensile loading, component 134 becomes highly fibrillated along the tensile load direction. Microcellular voids 136 elongate along the tensile direction and secondary phase cavities 138 caused by the dispersed immiscible secondary phase (e.g., HDPE) facilitate the interconnection of microcellular voids 136 to form channels 140 in component 134 such that the stretched component 134a becomes a bundle of fibrils. This change in structure turns the fracture mechanism from crack propagation across the polymer matrix into shear yielding of a bundle of fibrils in the tensile load direction. As such, the local triaxial stress is completely relieved after the material breaks into individual fibrils and does not propagate across the part. In this way, the ductility of component 134 is improved.

Figure 2:
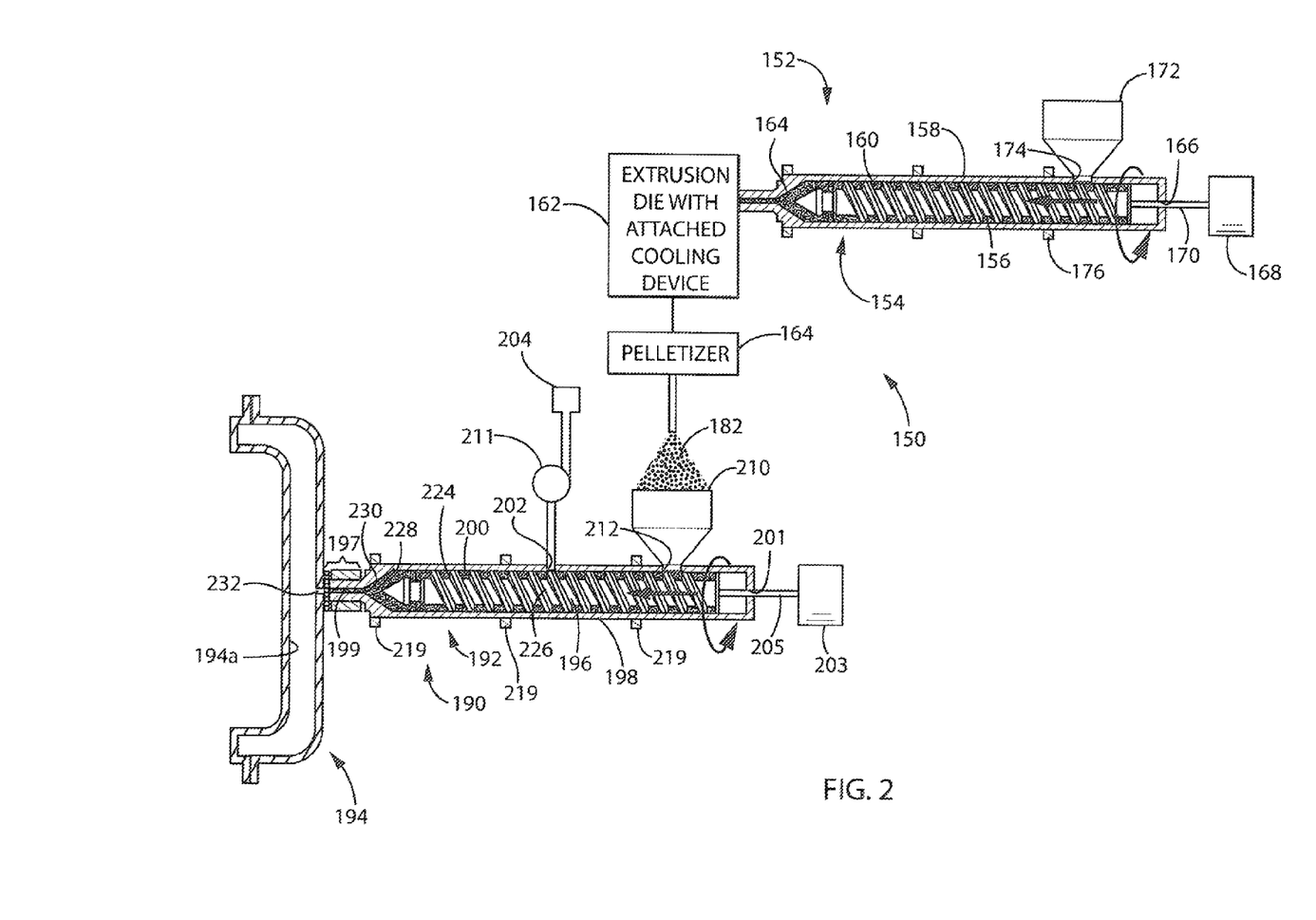
FIG. 2 is a schematic view of an alternate apparatus for fabricating foamed, injection molded component in accordance with the methodology of the present invention.

Referring to FIG. 2, an alternate apparatus for performing the methodology of the present invention is generally designated by the reference numeral 150. Apparatus 150 includes equipment set-up 152 for the production of pellets, as hereinafter described. Set-up 152 includes extruder 154 having screw 156 extending along a longitudinal axis and being rotatably supported within barrel 158 to convey polymeric material downstream within polymer processing space 160 toward extrusion die 162. Seals (not shown) may be provided on the flights of screw 156, for reasons hereinafter described. Barrel 158 is adapted to receive polymeric materials that are fluidic, or can form a fluid that subsequently hardens to form a conventional, or solid, polymeric article or component. Barrel 158 includes a first end fluidly connected to mold extrusion die 162 through nozzle 164 and a second, opposite end having aperture 166 extending therethrough. Drive motor 168 is operatively connected to screw 156 by drive shaft 170 extending through aperture 166 in second end of barrel 158. Drive motor 168 is operatively connected to a controller (not shown) for controlling rotational and axial movement of screw 156.

Extruder 154 further includes hopper 172 for introducing a blend of polymer materials into barrel 158. The material in hopper 172 is delivered into polymer processing space 160 within barrel 158 through an orifice 174. Polymer processing space 160 is defined by the outer surface of screw 156 and the inner surface of barrel 158. It is noted that the polymer materials may be in the form of solid pellets introduced through orifice 174 and plasticized within barrel 158. A plurality of temperature control units 176 are positioned along barrel 158. For example, control units 176 can take any suitable form such as electrical heaters or the like. It is intended for control units 176 to heat a stream of pelletized or fluid polymeric material within barrel 158 to facilitate melting and/or cooling of the stream to control viscosity. If desired, control units 36 can operate differently at different locations along barrel 158.

In operation, it is contemplated to provide first and second pelletized, polymeric materials which are immiscible in hopper 172. By way of example, it is contemplated to utilize polypropylene (PP) and high-density polyethylene (HDPE) in a preselected ratio. It can be appreciated that other polymeric materials may be utilized without deviating from the scope of the present invention. For example, a preselected ratio of approximately 75% PP to 25% LDPE or a preselected ratio of approximately 70% PLA to 30% PHBV may also used, as heretofore described, to maximize the ductility of the molded component. Referencing FIGS. 4a-4c, as noted above, it has been found that by utilizing a preselected ratio of at least 50% PP to 50% HDPE, a component molded in accordance with the methodology of the present herein described will show a significant improvement in the ductility and toughness as compared with components manufactured without HDPE or with less than 50% PP. Further, it is noted that elasticity of the component molded in accordance with the methodology of the present herein described remains relatively constant as compared with components manufacture without HDPE or with less than 50% PP. As best seen in FIGS. 4a and 4c, preferably, a preselected ratio of approximately 75% PP to 25% HDPE is used to maximize the ductility and toughness of the molded component.

At the beginning of a cycle, screw 156 is axially positioned adjacent the first end of barrel 158 in an initial position. The first and second pelletized polymeric materials in hopper 172 are delivered into polymer processing space 160 in barrel 158 in the preselected ratio through orifice 174. Screw 156 is rotated to urge the polymeric materials downstream such that the mechanical energy generated by rotation of screw 156 and control units 176 plasticize the first and second polymeric materials in polymer processing space 160 in barrel 158. Screw 156 mixes the first and second polymeric materials in polymer processing space 160 in barrel 158 so as to blend the plasticized material therein. As described, the first polymeric material defines a first phase of the plasticized material in polymer processing space 160 in barrel 158 and the second polymeric material defines a second phase of the plasticized material in polymer processing space 160 in barrel 158. It is intended for the first phase and the second phase of the blended polymeric material in polymer processing space 160 in barrel 158 to be immiscible, for reasons hereinafter described. Screw 156 maintains sufficient back pressure at all times to prevent the loss of pressure within extruder 154.

The blended polymeric material exits extrusion die 162 in strand form and cooled, e.g. by means of a water bath or, in the case of a water soluble polymeric materials, vortex gas cooling tubes or an air blade. Thereafter, the strands of the blended polymeric material are fed to pelletizer 164, wherein the strands are chopped or otherwise cut into suitably sized pellets 182. Pellets 182 are oven dried to remove the moisture content thereof. Once produced, pellets 182 are used by an injection molding machine to produce a desired component, as hereinafter described.

An alternate embodiment of an injection molding machine for use in performing the methodology of the present invention is generally designated by the reference numeral 190. Injection molding machine 190 includes extruder 192 fluidly connected to mold 194. Screw 196 extends along a longitudinal axis and is rotatably supported within barrel 198 to convey polymeric material downstream within polymer processing space 200 toward mold 194. Barrel 198 is adapted to receive pellets 182 and form a fluid that subsequently hardens to form a conventional, or solid, polymeric article or component. Barrel 198 includes a first end fluidly connected to mold 194 through nucleating pathway 199 of nozzle 197 and a second, opposite end having aperture 201 extending therethrough. Drive motor 203 is operatively connected to screw 196 by drive shaft 205 extending through aperture 201 in second end of barrel 198. Drive motor 203 is operatively connected to a controller (not shown) for controlling rotational and axial movement of screw 196.

Injection molding machine 190 includes hopper 210 for introducing pellets into barrel 198. In the depicted embodiment, pellets 182 in hopper 210 are delivered into polymer processing space 200 within barrel 198 through orifice 212. It can be appreciated, however, the other arrangements may be provided for delivering the preselected ratio of first and second polymeric materials into polymer processing space 200. By way of example, pellets or other forms of each of the first polymeric material and of the second polymeric material may be delivered into the polymer processing space 200 in the preselected ratio without deviating from the scope of the present invention. Polymer processing space 200 is defined by the outer surface of screw 196 and the inner surface of barrel 198. It is intended that pellets 182, fabricated as heretofore described, are introduced through orifice 212 and plasticized within barrel 198. More specifically, a plurality of temperature control units 219 are positioned along barrel 198. For example, control units 219 can take any suitable form such as electrical heaters or the like. It is intended for control units 219 to heat a stream of the pelletized material within barrel 198 to facilitate melting and/or cooling of the stream to control viscosity, in some cases, the solubility of the foaming agent, hereinafter described. Control units 219 can operate differently at different locations along barrel 198. For example, a first portion of control units 219 may heat the stream at one or more locations along barrel 198, while a second portion of the control units 219 may cool the stream at one or more different locations along barrel 198.

Injection molding machine 190 further includes at least one foaming agent port 202 fluidly connecting foaming agent source 204 to polymer processing space 200 within barrel 198. As hereinafter described, it is intended for a foaming agent to be injected into the polymeric material within the polymer processing space 198 to form a polymer and foaming agent solution therein. Pressure and metering device 211 is provided between foaming agent source 204 and the at least one foaming agent port 202. Pressure and metering device 211 may be used to meter the foaming agent so as to control the amount of the foaming agent in the polymeric stream within barrel 198 and maintain the foaming agent at a desired level. Although foaming agent port 202 may be located at any of a variety of locations along barrel 198, it is preferably located just upstream from mixing section 224 of screw 196 and from foaming agent receiving section 226 of screw 196 wherein screw 196 includes unbroken flights. Mixing section 224 is adapted for mixing the foaming agent and polymeric material to promote the formation of a blended solution of the polymeric material and the foaming agent within barrel 198.

Injection molding machine 190 further may include a restriction element upstream of foaming agent port 202 and foaming agent receiving section 226 and downstream of a metering section 228 of screw 196 to maintain the polymeric material and foaming agent solution downstream of the restriction element at sufficient pressure throughout the injection process. The restriction element is one example of an arrangement in which extruder 192 is constructed and arranged to maintain a solution of polymers and foaming agent within polymer processing space 200 between foaming agent port 202 and inlet 230 of nucleating pathway 199 at a relatively high pressure through an injection or ejection cycle, hereinafter described. The restriction element can take any of a variety of forms known in the art for restricting the upstream flow of polymer material, such as a blister, a dam across the feed-section of the screw, a reverse screw flight, a valve or a ring check valve.

In order to form the component in accordance with the methodology of the present invention, it is contemplated to provide pellets 182 with hopper 210. A foaming agent in the form of a supercritical fluid, e.g. carbon dioxide or nitrogen, is provided by foaming agent source 204 to the injection molding machine 190. It is noted that other foaming agents may be used without deviating from the scope of the present invention. At the beginning of an injection cycle, screw 196 is axially positioned adjacent the first end of barrel 198 in an initial position. Pellets 182 are delivered into polymer processing space 200 in barrel 198 through orifice 212. Screw 196 is rotated to urge the polymeric materials downstream such that the mechanical energy generated by rotation of screw 196 and control units 219 plasticize pellets 192 in polymer processing space 200 in barrel 198. Supercritical gas, e.g. carbon dioxide or nitrogen, is introduced into polymer processing space 200 through at least one foaming agent port 202 where it is mixed with the plasticized pellets 182 via screw 196. Screw 196 maintains sufficient back pressure at all times to prevent premature foaming. The solution of the supercritical fluid and the plasticized pellets 182 formed in extruder 192 has a very low viscosity which advantageously allows lower temperature molding, as well as, rapid filling of molds having close tolerances to form very thin molded parts. The polymeric material and foaming agent solution is accumulated in accumulation region 250 within barrel 198 downstream of screw 196.

Once a sufficient volume of the solution has accumulated in the metering section 228, screw 196 is moved in a downstream direction so as to inject the solution into nucleating pathway 199 through inlet 230 thereof. As the solution of polymeric material and foaming agent passes through nucleating pathway 199, the pressure drop in the nucleating pathway 199 causes the nucleation of the solution. The nucleated polymeric material is injected into the molding chamber of mold 194 through outlet 232 of nucleating pathway 199. After injection, screw 196 once again rotates to build up the polymeric material (and foaming agent) in the metering section 228 for the next injection.

The nucleated polymeric material received in the molding chamber of mold 194 begins to cool as soon as the nucleated polymeric material contacts inner surface 194a of mold 194. The molding chamber of mold 194 is filled with the nucleated polymeric material and the nucleated polymeric material solidifies into component 134 as it cools. After a sufficient time period has passed, the cooled component 134 may now be ejected from mold 194. As is conventional, the size and shape of component 134 corresponds to the size and shape of the molding chamber of mold 194. Mold 194 is opened and component 134 is ejected therefrom. Once the part is ejected, mold 194 is closed and the process may be repeated.

With reference to FIGS. 3a-3c, as heretofore described, it can be seen that component 134 includes a plurality of microcellular voids 136 therein. Under tensile loading, the second phase of the polymeric material cavitates, thereby allowing for the formation of a plurality of secondary phase cavities 138 in component 134. It can be appreciated that the diameters of the microcellular voids are greater than the diameters of the secondary phase cavities. By molding component 134 utilizing two immiscible polymeric materials (e.g., polypropylene (PP) and high-density polyethylene (HDPE)) in the preselected ratio, as heretofore described, in accordance with the methodology of the present invention, it has been found that microcellular voids 136 have diameters greater than 10 micrometers, and preferably, in the range of 50 to 100 micrometers, while secondary phase cavities 138 have diameters less than 1 micrometer. The combination of microcellular voids 136 and secondary phase cavities 138 in component 134 results in the ductility of component 134 being at least three times as high as the ductility of unfoamed solid parts, FIG. 4a. More specifically, as best seen in FIG. 3c, under tensile loading, component 134 becomes highly fibrillated along the tensile load direction. Microcellular voids 136 elongate along the tensile direction and secondary phase cavities 138 caused by the dispersed immiscible secondary phase (e.g., HDPE) facilitate the interconnection of microcellular voids 136 to form channels 140 in component 134 such that the stretched component 134a becomes a bundle of fibrils. This change in structure turns the fracture mechanism from crack propagation across the polymer matrix into shear yielding of a bundle of fibrils in the tensile load direction. As such, the local triaxial stress is completely relieved after the material breaks into fibrils and does not propagate across component 134. In this way, the ductility of component 134 is improved.

Various modes of carrying out the invention are contemplated as being within the scope of the following claims particularly pointing and distinctly claiming the subject matter that is regarded as the invention.

We claim:

1. A method of fabricating an injection-molded component, comprising the steps of:
introducing pellets and a supercritical fluid into an injection barrel of an injection molding machine, the pellets including a first polymeric material and a second polymeric material;
plasticizing the pellets within the injection barrel to form an injection material, the first polymeric material defining a first phase of the injection material and the second polymeric material defining a second phase of the injection material;
injecting the injection material into a mold to fabricate the injection-molded component; and
forming microcellular voids having diameters in the injected-molded component; wherein secondary phase cavities having diameters are formed in the injected-molded component in response to the tensile loading of the injected-molded component, the diameters of the microcellular voids being greater than the diameters of the secondary phase cavities.

2. The method of claim 1 wherein the microcellular voids have diameters greater than 10 micrometers.

3. The method of claim 2 wherein the secondary phase cavities have diameters less than 1 micrometer.

4. The method of claim 2 wherein the microcellular voids have diameters in the range of 50 to 100 micrometers.

5. The method of claim 1 wherein the first phase and the second phase are immiscible.

6. The method of claim 1 comprising the additional steps of:
heating the first and second polymeric materials and the supercritical fluid to produce a melt;
extruding the melt; and
forming the pellets from the extruded melt.

7. The method of claim 1 wherein the supercritical fluid is introduced into the injection barrel downstream of the pellets.

8. The method of claim 1 wherein the first polymeric material is polypropylene (PP) and the second polymeric material is high-density polyethylene (HDPE).

9. The method of claim 1 wherein the injection material includes at least 50% of the first polymeric material and less than 50% of the second polymeric material.

10. The method of claim wherein the first polymeric material is in the range of 60% to 85% of the injection material.

11. A method of fabricating a foamed, injection-molded component, comprising the steps of:
plasticizing a first polymeric material and a second polymeric material within an injection barrel to form an injection material, the first polymeric material defining a first phase of the injection material and the second polymeric material defining a second phase of the injection material;
injecting the injection material into a mold to fabricate the foamed, injection-molded component;
forming microcellular voids having diameters in the injected-molded component;
subjecting the injected-molded component to tensile loading; and
forming secondary phase cavities having diameters in the injected-molded component in response to the tensile loading of the injected-molded component, the diameters of the microcellular voids being greater than the diameters of the secondary phase cavities;
wherein the first phase and the second phase of the injection material are immiscible.

12. The method of claim 11 wherein the microcellular voids have diameters greater than 10 micrometers.

13. The method of claim 12 wherein the secondary phase cavities have diameters less than 1 micrometer.

14. The method of claim 13 wherein the microcellular voids have diameters in the range of 50 to 100 micrometers.

15. The method of claim 11 comprising the additional steps of:
heating the first and second polymeric materials and a supercritical fluid to produce a melt;
extruding the melt;
forming pellets from the extruded melt; and
introducing the pellets into the injection barrel.

16. The method of claim 15 wherein a supercritical fluid is introduced into the injection barrel downstream of the pellets.

17. The method of claim 11 wherein the first polymeric material is polypropylene (PP) and the second polymeric material is high-density polyethylene (HDPE).

18. The method of claim 11 wherein the injection material includes at least 50% of the first polymeric material and less than 50% of the second polymeric material.

19. The method of claim 18 wherein the first polymeric material is in the range of 60% to 85% of the injection material.

20. A method of fabricating a foamed, injection-molded component, comprising the steps of:
plasticizing a first polymeric material and a second polymeric material within an injection barrel to form an injection material; and
injecting the injection material into a mold to fabricate the foamed injection-molded component, the foamed injection-molded component including microcellular voids having diameters;
wherein:
secondary phase cavities having diameters are formed in the injected-molded component in response to tensile loading of the injection molded component; and
the diameters of the microcellular voids are greater than the diameters of the secondary phase cavities.

21. The method of claim 20 wherein the microcellular voids have diameters greater than 10 micrometers.

22. The method of claim 21 wherein the secondary phase cavities have diameters less than 1 micrometer.

23. The method of claim 21 wherein the microcellular voids have diameters in the range of 50 to 100 micrometers.

24. The method of claim 20 wherein the first polymeric material defines a first phase of the injection material and the second polymeric material defines a second phase of the injection material, the first and second phases of the injection material being immiscible.

25. The method of claim 20 wherein the first polymeric material is polypropylene (PP) and the second polymeric material is high-density polyethylene (HDPE).

26. The method of claim 20 wherein the injection material includes at least 50% of the first polymeric material and less than 50% of the second polymeric material.

27. The method of claim 26 wherein the first polymeric material is in the range of 60% to 85% of the injection material.

* * * * *